United States Patent

Rosenberg et al.

[15] 3,689,655
[45] Sept. 5, 1972

[54] RODENTICIDAL AND RODENT REPELLENT COMPOSITIONS

[72] Inventors: Franklin J. Rosenberg, Bethlehem, N.Y.; James G. Miller, Fort Lauderdale, Fla.

[73] Assignee: Sterling Drug Inc., New York, N.Y.

[22] Filed: Dec. 7, 1970

[21] Appl. No.: 95,991

[52] U.S. Cl. .................................... 424/273, 424/17
[51] Int. Cl. ......................... A01n 9/22, A01n 17/08
[58] Field of Search ............. 424/273, 17; 260/309.6

[56] References Cited

UNITED STATES PATENTS 3,113,071   12/1963   Derse et al. ................. 424/17
3,404,156   10/1968   Archer .................. 260/309.6
3,418,656   12/1968   Vassiliates ............... 424/17 X Primary Examiner—Albert T. Meyers
Assistant Examiner—Leonard Schenkman
Attorney—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

Rodent repellent and rodenticidal compositions containing as the active ingredient 1-(2-imidazolin-2-yl-methyl)-3-ethylindole and methods of combatting rodents comprising orally administering an effective rodent repellent or rodenticidal quantity of the active ingredient.

14 Claims, No Drawings

RODENTICIDAL AND RODENT REPELLENT COMPOSITIONS

This invention relates to the art of combatting rodents, and it particularly relates to compositions and methods for either exterminating rodents or for merely repelling, without killing, rodents from areas or from materials which they would otherwise damage or destroy in the process of following their normal feeding habits.

The problem of combatting rodent infestation or attack on areas or materials vital to man's welfare by use of chemical agents can be approached in either one of two ways. The usual approach is to attempt to kill off the offending rodent population by making available to rodents in areas usually frequented by them a food bait containing a rodenticidal agent. Ideally such rodenticides should have such toxic properties that they provide essentially a one-dose killing action. But the rapidity of onset of the toxic action should, on the other hand, be sufficiently delayed that the rodents do not die at the bait site and thus discourage further feeding by other members of the rodent population. One of the most widely used rodenticides, 3-($\alpha$-acetonylbenzyl)-4-hydroxycoumarin (Warfarin), which causes death by internal hemorrhaging, is ideal from the standpoint of causing delayed deaths, but since it requires repeated ingestion, it fails to meet the one-dose criterion of the ideal rodenticide.

Another approach to combatting rodent infestation or attack is to treat an area or a particular material on which rodents normally feed, and which it is desired to protect from rodent damage or destruction, with a composition which the rodents find from experience is unpalatable or otherwise physiologically objectionable. Such compositions act to discourage further attack without actually killing off the rodent population. This approach to the problem would be used when, say for ecological reasons, it might be undesirable (in the course of protecting an area from destruction by rodents) to kill off large parts of natural populations. For example, the problem of the destruction by rodents of seeds and seedlings used for reforestation is particularly acute, but in the interest of preserving a natural balance of wildlife, it would be undesirable in protecting such seeds or seedlings to exterminate an entire rodent population by use of a rodenticide. It would thus be preferable in this instance to treat the seeds or seedlings to be protected with a composition which would merely discourage consumption by the rodents without causing large numbers of deaths.

It has now been surprisingly found that 1-(2-imidazolin-2-ylmethyl)-3-ethylindole having the formula:

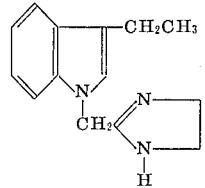

and which is disclosed and claimed in Archer U.S. Pat. No. 3,404,156 issued Oct. 1, 1968, can, depending upon the quantity administered, function either as one-dose rodenticide or as a rodent repellent. Use of this compound in food compositions voluntarily ingested by rodents in the course of feeding therefore offers a means of combatting rodents by either killing or repelling them as desired.

Therefore, in its general aspect, the invention relates to a composition for combatting rodents consisting essentially of a food material containing as the active ingredient an effective rodent repellent or rodenticidal amount of 1-(2-imidazolin-2-ylmethyl)-3-ethylindole. The invention also relates to a method of combatting rodents comprising orally administering to such rodents an effective rodent repellent or rodenticidal amount of the said active ingredient.

In one of its more specific aspects, the invention relates to rodent repellent food compositions containing an effective rodent repellent quantity of the said 1-(2-imidazolin-2-ylmethyl)-3-ethylindole as the active ingredient. It is preferred to admix the active ingredient in effective rodent repellent amount with an inert, powdery carrier material to provide a powdery composition which is then dusted or spread over areas or on materials on which rodents normally feed. For purposes of describing the invention such powdery carriers are considered food compositions, although the primary function of the carrier is to provide a vehicle for dispersing the active ingredient onto materials which it is desired to protect from further attack and destruction.

Another aspect of the invention relates to a method for providing rodent repellency which comprises orally administering to the rodents a composition containing an effective rodent repellent amount of the said 1-(2-imidazolin-2-ylmethyl)-3-ethyl-indole as the active ingredient. Administration of the repellent composition is accomplished by treating a surface or a material on which rodents normally feed with a composition containing the active ingredient in effective rodent repellent amount.

In still another aspect, the invention relates to rodenticidal compositions containing an effective rodenticidal quantity of 1-(2-imidazolin-2-ylmethyl)-3-ethylindole as the active ingredient. It is preferred to admix the active ingredient in effective rodenticidal amount with an inert carrier feed material to provide a feed bait for voluntary ingestion by the rodents.

In still another aspect, the invention relates to a method for killing rodents which comprises orally administering to rodents by the voluntary feeding process an effective rodenticidal quantity of the said 1-(2-imidazolin-2-ylmethyl)-3-ethyl-indole. The active ingredient is preferably admixed in effective rodenticidal quantity with a food material to provide a food bait.

When used as a rodent repellent, the active ingredient is preferably mixed, either in the form of the free base or as an acid-addition salt, with a feed material, for example cereal grain, or with an inert, powdery material (e.g. starch, cornflour, talcum, and the like) to provide a dry dusting powder for spreading over areas or on materials to be protected. In such mixtures, the active ingredient preferably comprises from 0.001 to 0.015 percent by weight of the repellent composition. Such repellent compositions are either placed in an area from which it is desired to discourage rodents, or alternatively materials to be protected from rodent consumption, such as seeds or seedlings, are dusted with a powdery repellent composition as described above. At the above-indicated concentration of the active ingredient, rodents will consume some of the so-treated feed or materials treated with the dusting composition, but at the levels of active ingredient indicated, few animals will ingest sufficient food material to absorb a lethal quantity of the active ingredient. In fact the animals, after ingesting sub-lethal amounts of the treated food material, consume progressively smaller amounts of such treated materials after several exposures thereto until after a period of around two to four days, they become hesitant to accept any more of the treated food material. A substantial decrease in the rate of attrition of materials to be protected is thus achieved while at the same time avoiding needless extermination of an entire rodent population. A particularly preferred composition for achieving such rodent repellent action is one in which the active ingredient comprises 0.005 to 0.009 percent by weight of the repellent composition.

When used as a rodenticide, the active agent is advantageously mixed, either in the form of the free-base or as an acid-addition salt, with a feed material, for example a cereal grain such as cornmeal, wherein the active agent comprises from 0.05 to 0.15 percent by weight of the feed material. Obviously higher concentrations of the active agent can be utilized effectively, but no advantage is gained thereby, because due to the rapidity of onset of toxic symptoms at higher concentrations, there is some likelihood that the animals would die near the bait site thus causing unwanted bait shyness in the surviving members of the population. Furthermore, the active ingredient can, if desired, be disguised in an otherwise highly palatable food bait by incorporating the active ingredient therein in an encapsulated, delayed release form. When the rodenticidal agent is ingested in such form, the rodents fail to experience the repellent effects of the active ingredient, and therefore they will generally consume near normal quantities of food while simultaneously ingesting proportionately larger quantities of the active rodenticidal agent. It is thus possible, by using such encapsulation methods, to employ a much broader range of concentrations of the active ingredient, e.g. from 0.003 to 0.45 percent based on the total weight of the composition. Preferred rodenticidal compositions are ones in which the active ingredient in unencapsulated and encapsulated forms comprises, respectively, 0.07 to 0.09 percent and 0.005 to 0.010 percent by weight of the feed mixture. Such concentrations provide a sufficient delay in the time of death following oral ingestion so as to avoid the above-indicated problem arising from too rapid onset of toxic action while at the same time providing an overall high kill rate.

While the invention herein is specifically exemplified by use of a particular acid-addition salt of the subject 1-(2-imidazolin-2-ylmethyl)-3-ethylindole, either the free base itself or other acid-addition salts are all effective in the practice of the invention and are considered to be within the purview thereof. In fact the use of water insoluble salts of the said 1-(2-imidazolin-2-ylmethyl)-3-ethylindole are specifically considered to be useful in the practice of the invention, because they afford a ready means of controlling the physiological absorbability of the active compound and thus permit further control over the rapidity of onset of toxic effects of the subject compositions.

The following test procedures were used for determining the rodent repellent and rodenticidal effects of 1-(2-imidazolin-2-ylmethyl)-3ethylindole.

Test I. A food bait material was prepared by thoroughly mixing a premixture containing 5 percent by weight of 1-(2-imidazolin-2-ylmethyl)-3-ethylindole hydrochloride and cornstarch with dry cornmeal in an amount to provide a final concentration in the food material of 0.008 percent of the active ingredient on a weight/weight basis.

This food material was made available ad libitum over a four day period to five male rats weighing from 324–376 grams which had been fasted for the previous twenty-four hours and whose normal food consumption was 25–30 grams/day/rat. The amount of treated cereal bait in grams consumed by each of the rats over a period of four days is given in the following table.

|  | Day 1 | Day 2 | Day 3 | Day 4 |
| --- | --- | --- | --- | --- |
| Rat 1 | 3.7 | 3.8 | 0.0 | 1.6 |
| Rat 2 | 8.4 | 3.2 | 0.0 | 0.0 |
| Rat 3 | 0.0 | 3.3 | 1.6 | 0.0 |
| Rat 4 | 8.2 | 1.0 | 0.9 | 0.0 |
| Rat 5 | 7.4 | 2.1 | 2.7 | 0.0 |
| Average | 5.5 | 2.7 | 1.0 | 0.3 |

From the above it will be seen that with repeated exposure to and experience with the treated cereal grain on a day-to-day basis, the test animals developed an increasing distaste for the food bait as evidenced by a sharp reduction in their daily food consumption rate, even on the first day's exposure to the treated food, and by a progressive, day-by-day decrease in the daily consumption of the treated cereal grain. Even though no food other than that containing the active ingredient was available to the animals during the four day experiment, all animals survived the test despite severe emaciation of all animals in the group. Moreover, when untreated food was made available to them following the test period, all animals ate voraciously and all returned to their original weight levels within a few days.

Test II: A cornmeal food bait containing 0.008 percent of the active ingredient on a weight/weight basis was prepared as described above in Test I. This bait was made available to eight male and seven female mice ad libitum on the third and fourth day following two days of a normal diet consisting of untreated cornmeal. The total amounts of food material in grams consumed by the groups of male and female mice on a day-to-day basis are given in the following table.

|  | Day 1 | Day 2 | Day 3 | Day 4 |
| --- | --- | --- | --- | --- |
|  | (Cornmeal Only) | | (Cornmeal Plus 0.008% Active Ingredient) | |
| 8 Males | 37.5 | 47.3 | 8.6 | 17.9 |
| 7 Females | 33.5 | 44.1 | 4.6 | 9.5 |
| Group Avg. | 35.5 | 45.7 | 6.6 | 13.7 |
| Avg./Mouse | 4.7 | 6.1 | 0.8 | 1.2 |

The above data show that consumption of cornmeal treated with the active ingredient decreased an average of 83–87 percent on the first day and from 74–80 percent on the second day of exposure of the mice to the treated food material over the normal consumption rate. As in Text I above, no food other than the treated cornmeal bait was available to the animals during the third and fourth days of the experiment. One animal died on each of days 3 and 4. The survivors, despite severe emaciation, returned to their normal weights within a few days when a normal diet was restored to them following the test.

Test III: A cornmeal bait containing 0.08 percent of the active ingredient on a weight/weight basis was prepared as described above in Test I. This bait when offered ad libitum to a group of ten rats afforded an 80 percent kill rate in a 24 hour period of an average consumption of from 1–3 grams of treated bait per rat. Deaths in the group of test animals began as soon as one hour following ingestion, and toxic manifestations, consisting of piloerection, face washing, and stretching movements, began occurring about 15 minutes after ingestion.

We claim:

1. A composition for combatting rodents comprising a food material and as the active ingredient an effective rodent repellent or rodenticidal amount of 1-(2-imidazolin-2-ylmethyl)-3-ethylindole.

2. The composition of claim 1 for repelling rodents containing as the active ingredient an effective rodent repellent amount of 1-(2-imidazolin-2-ylmethyl)-3-ethylindole.

3. The composition of Claim 1 for killing rodents containing as the active ingredient an effective rodenticidal amount of 1-(2-imidazolin-2-ylmethyl)-3-ethylindole.

4. The composition of Claim 2 comprising, as the food material, a dry, powdery carrier material and wherein the active ingredient comprises from 0.001 to 0.015 percent by weight of the total composition.

5. The composition of Claim 3 wherein the active ingredient comprises from 0.05 to 0.15% by weight of the total composition.

6. The composition of Claim 4 wherein the active ingredient comprises 0.005 to 0.009 percent by weight of the total composition.

7. The composition of claim 5 wherein the active ingredient comprises 0.07 to 0.09 percent by weight of the total composition.

8. The method for combatting rodents comprising orally administering thereto an effective amount of the composition of claim 1.

9. The method for repelling rodents comprising orally administering to rodents an effective amount of the composition of claim 2.

10. The method for killing rodents comprising orally administering thereto an effective amount of the composition of claim 3.

11. The method for repelling rodents comprising orally administering to rodents an effective amount of the composition of claim 4.

12. The method for killing rodents comprising orally administering thereto an effective amount of the composition of claim 5.

13. The method for repelling rodents comprising orally administering to rodents an effective amount of the composition of claim 6.

14. The method for killing rodents comprising orally administering thereto an effective amount of the composition of claim 7.

* * * * *